US010966017B2

(12) United States Patent
Hardin et al.

(10) Patent No.: US 10,966,017 B2
(45) Date of Patent: Mar. 30, 2021

(54) MICROPHONE PATTERN BASED ON SELECTED IMAGE OF DUAL LENS IMAGE CAPTURE DEVICE

(71) Applicant: GoPro, Inc., San Mateo, CA (US)

(72) Inventors: Mark Hardin, Guerneville, CA (US); Erich Tisch, San Francisco, CA (US); Eric Penrod, Brentwood, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/239,973

(22) Filed: Jan. 4, 2019

(65) Prior Publication Data

US 2020/0221219 A1   Jul. 9, 2020

(51) Int. Cl.
*H04R 1/40* (2006.01)
*H04N 5/60* (2006.01)
*H04N 5/225* (2006.01)

(52) U.S. Cl.
CPC ............. *H04R 1/406* (2013.01); *H04N 5/225* (2013.01); *H04N 5/60* (2013.01); *H04R 2499/11* (2013.01)

(58) Field of Classification Search
CPC ...... H04R 1/406; H04R 2499/11; H04N 5/60; H04N 5/225
See application file for complete search history.

(56) References Cited

U.S. PATENT DOCUMENTS

| 9,432,768 | B1* | 8/2016 | O'Neill | H04R 3/005 |
| 2010/0110232 | A1* | 5/2010 | Zhang | H04N 5/23212 |
| | | | | 348/240.3 |
| 2011/0317041 | A1* | 12/2011 | Zurek | H04R 1/406 |
| | | | | 348/240.99 |
| 2014/0362253 | A1* | 12/2014 | Kim | H04N 5/262 |
| | | | | 348/231.4 |
| 2015/0125011 | A1* | 5/2015 | Sekiya | H04S 7/307 |
| | | | | 381/307 |
| 2016/0044410 | A1* | 2/2016 | Makinen | H04R 1/406 |
| | | | | 381/26 |
| 2016/0182799 | A1* | 6/2016 | Laaksonen | H04N 5/247 |
| | | | | 348/211.11 |
| 2017/0055072 | A1* | 2/2017 | Kim | H04N 5/23219 |
| 2018/0227665 | A1* | 8/2018 | Elko | H04R 1/406 |
| 2018/0343517 | A1* | 11/2018 | Usher | H04R 1/406 |
| 2019/0020818 | A1* | 1/2019 | Takada | H04N 5/265 |

(Continued)

*Primary Examiner* — Jason A Flohre
(74) *Attorney, Agent, or Firm* — Young Basile Hanlon & MacFarlane, P.C.

(57) ABSTRACT

An image capture device may include a sensor, a microphone array, and a processor. The microphone array may include a first microphone, a second microphone, a third microphone, or any combination thereof. The first microphone may be configured to face a first direction. The second microphone may be configured to face a second direction. The second direction may be diametrically opposed to the first direction. The third microphone may be configured to face a third direction. The third direction may be substantially perpendicular to the first direction, the second direction, or both. The processor may be configured to determine a microphone capture pattern. The microphone capture pattern may be determined based on data obtained from the sensor. The sensor data may include image data, audio data, image capture device orientation data, location data, accelerometer data, or any combination thereof.

20 Claims, 12 Drawing Sheets

(56) References Cited

U.S. PATENT DOCUMENTS

| | | | | |
|---|---|---|---|---|
| 2019/0246203 A1* | 8/2019 | Elko | .................. | H04R 1/406 |
| 2019/0342495 A1* | 11/2019 | Kaga | .................. | H04N 5/2253 |
| 2020/0015007 A1* | 1/2020 | Matsuura | .............. | H04R 3/005 |

* cited by examiner

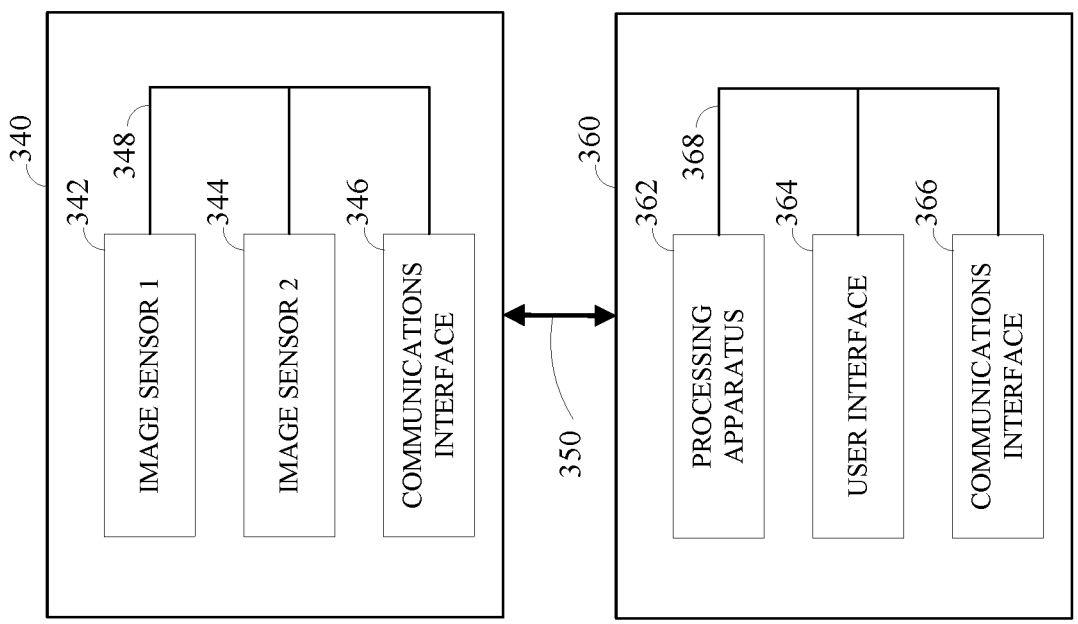
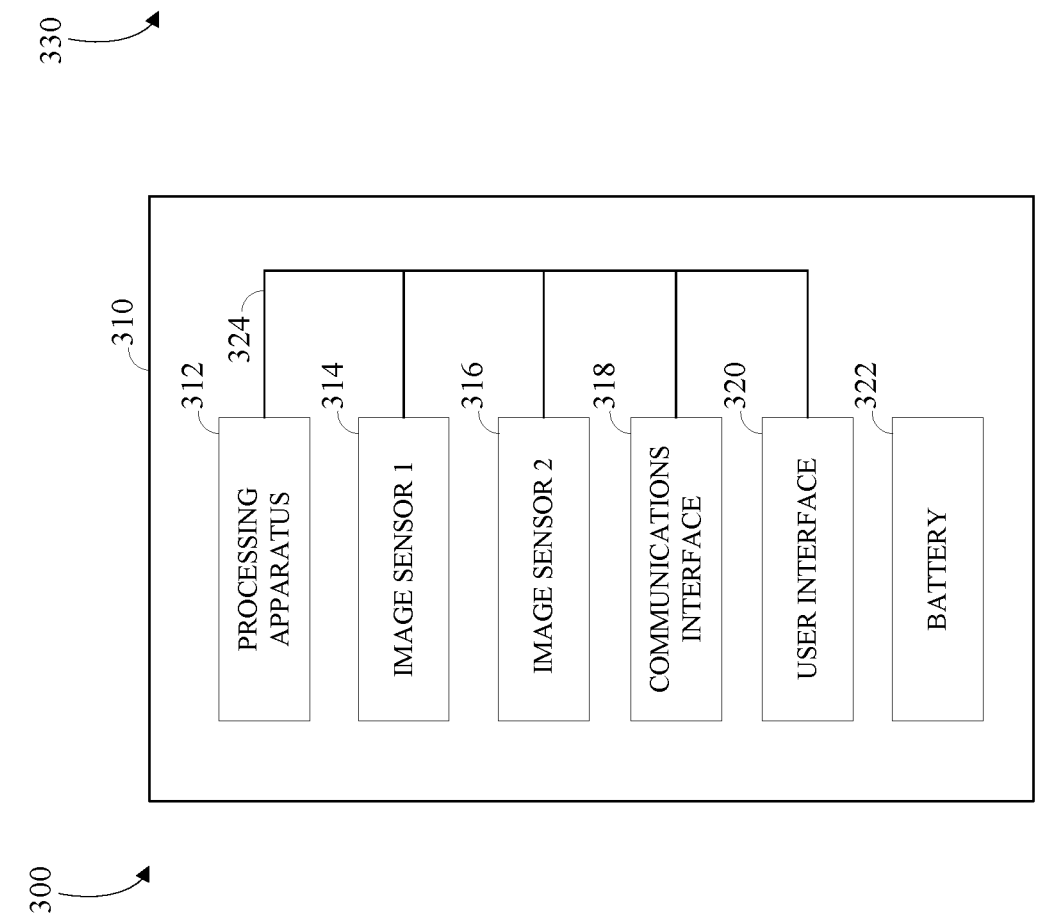
FIG. 3B
FIG. 3A

MICROPHONE PATTERN BASED ON SELECTED IMAGE OF DUAL LENS IMAGE CAPTURE DEVICE

TECHNICAL FIELD

This disclosure relates to audio capture patterns for electronic devices.

BACKGROUND

Dual-lens cameras are used to simultaneously record from a first-person perspective using a forward-facing lens and of the user using a rear-facing lens. Images from the dual lenses may be stitched together to create a spherical image. Typically, one audio stream is recorded. The audio may be sufficient for the forward-facing lens, however it may be insufficient for the rear-facing lens, for example when the user is narrating the scene being captured.

SUMMARY

Disclosed herein are implementations of microphone pattern selection. An aspect includes an image capture device. The image capture device may include a first image sensor, a second image sensor, a microphone array, and a processor. The first image sensor may be configured to face a first direction. The first image sensor may be configured to obtain first image data. The second image sensor may be configured to face a second direction. The second direction may be diametrically opposed to the first direction. The second image sensor may be configured to obtain second image data.

The microphone array may include a first microphone, a second microphone, a third microphone, or any combination thereof. The first microphone may be configured to face the first direction. The second microphone may be configured to face the second direction. The third microphone may be configured to face a third direction. The third direction may be substantially perpendicular to the first, the second direction, or both. The processor may be configured to determine a microphone capture pattern. The determined microphone capture pattern may be based on the first image data, the second image data, or both. Any of the first microphone, the second microphone, or the third microphone may be used to transform a sound capture to any component of an Ambisonics B-Format. For example, the first microphone may be configured to transform a sound capture to an X-axis component of an Ambisonics B-Format, the second microphone may be configured to transform a sound capture to a Y-axis component of an Ambisonics B-Format, and the third microphone may be configured to transform a sound capture to a Z-axis component of an Ambisonics B-Format.

An aspect may include a method that includes obtaining first image data. The first image data may be obtained from a first image sensor. The first image sensor may be facing a first direction. The method may include obtaining second image data. The second image data may be obtained from a second image sensor. The second image sensor may be facing a second direction. The second direction may be diametrically opposed to the first direction. The method may include determining a microphone capture pattern. The microphone capture pattern may be determined based on the first image data, the second image data, or both.

An aspect may include an image capture device. The image capture device may include a sensor, a microphone array, and a processor. The microphone array may include a first microphone, a second microphone, a third microphone, or any combination thereof. The first microphone may be configured to face a first direction. The second microphone may be configured to face a second direction. The second direction may be diametrically opposed to the first direction. The third microphone may be configured to face a third direction. The third direction may be substantially perpendicular to the first direction, the second direction, or both. The processor may be configured to determine a microphone capture pattern. The microphone capture pattern may be determined based on data obtained from the sensor. The sensor data may include image data, audio data, image capture device orientation data, location data, accelerometer data, or any combination thereof. Any of the first microphone, the second microphone, or the third microphone may be used to transform a sound capture to any component of an Ambisonics B-Format. For example, the first microphone may be configured to transform a sound capture to an X-axis component of an Ambisonics B-Format, the second microphone may be configured to transform a sound capture to a Y-axis component of an Ambisonics B-Format, and the third microphone may be configured to transform a sound capture to a Z-axis component of an Ambisonics B-Format.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
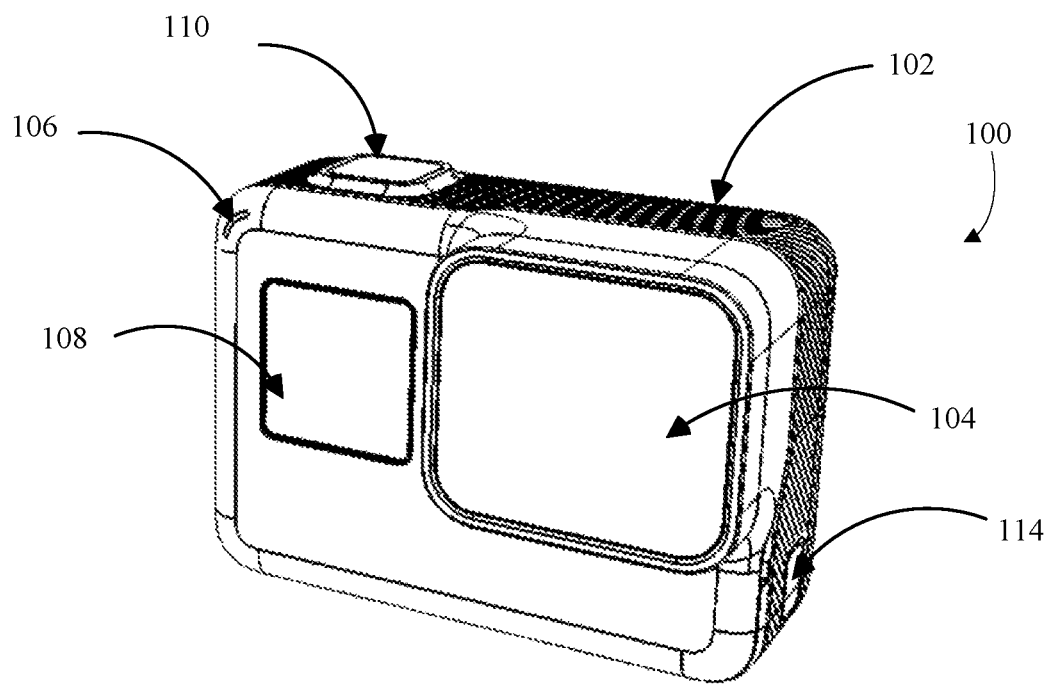
FIGS. 1A-D are isometric views of an example of an image capture device.
Figure 1B:
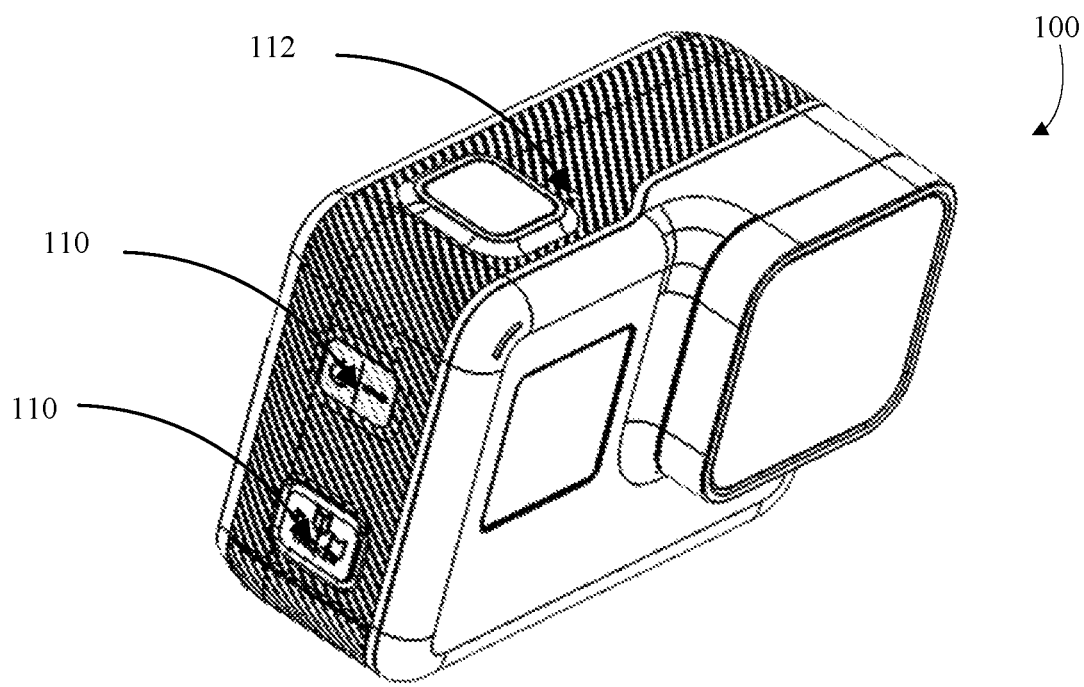
Figure 1C:
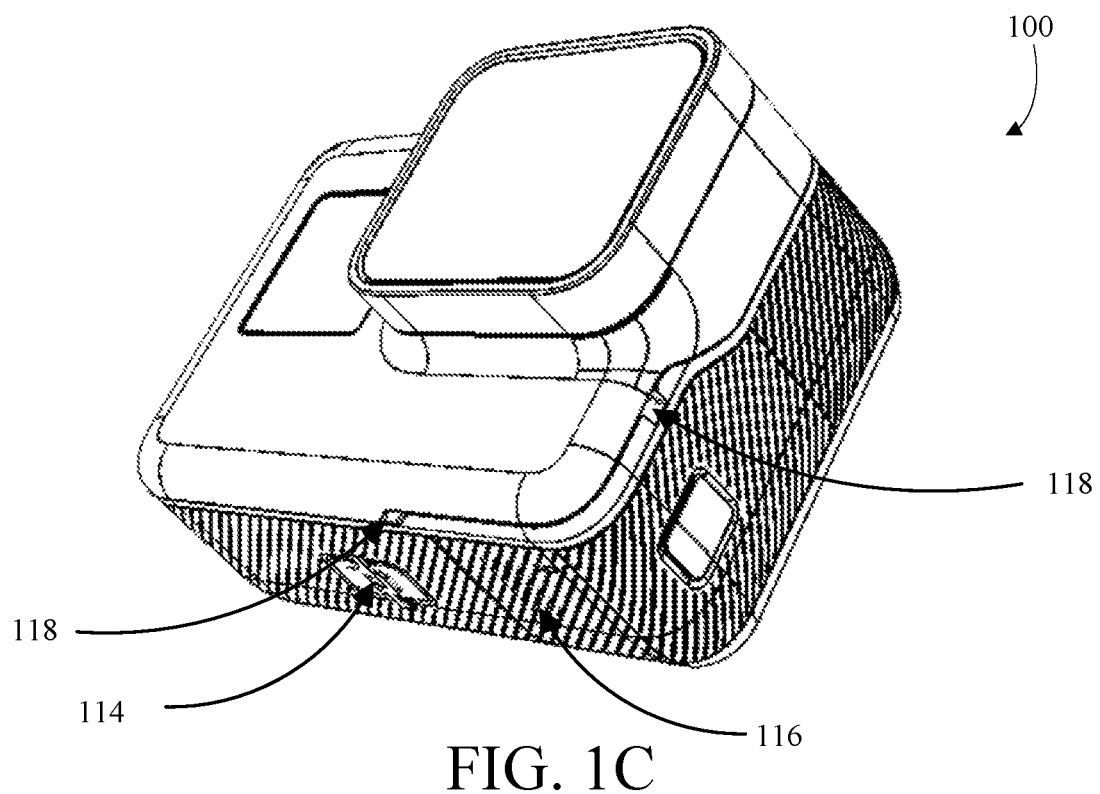
Figure 1D:
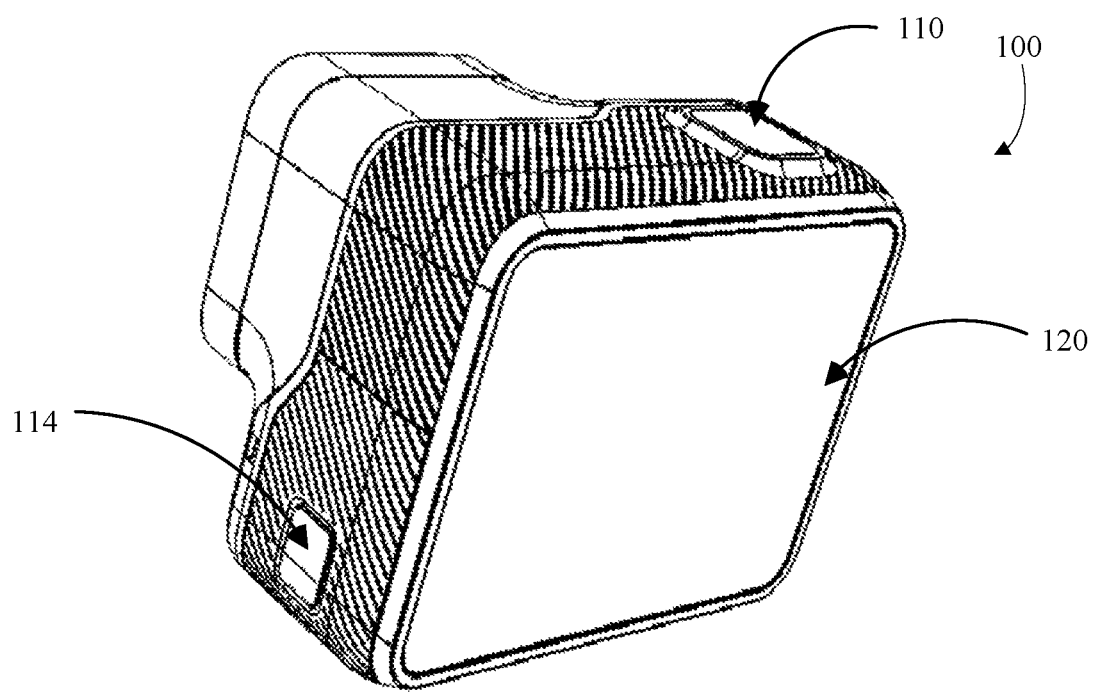

In the implementations described herein, a microphone capture pattern that a user experiences may be arrived at from a variety of approaches. In a first approach, a microphone may natively have a desired capture pattern. This may be the case where a direction microphone element is pointed in the desired direction or an omnidirectional microphone is shielded by the camera body such that it is more sensitive in the desired direction.

In another approach a desired capture pattern may be created using two or more omnidirectional microphone signals. For example, two microphone signals may be summed together using beamforming techniques.

In another example, a desired capture pattern may be created from Ambisonics. This example may leverage the coordinate system defined in Ambisonics.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. The image capture device 100 may include other microphones not shown, for example on the side above the button 110, beneath the front cover with the drain ports 118, or both. A side of the image capture device 100 may include an I/O interface 114. The image capture device 100 may also include a speaker 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
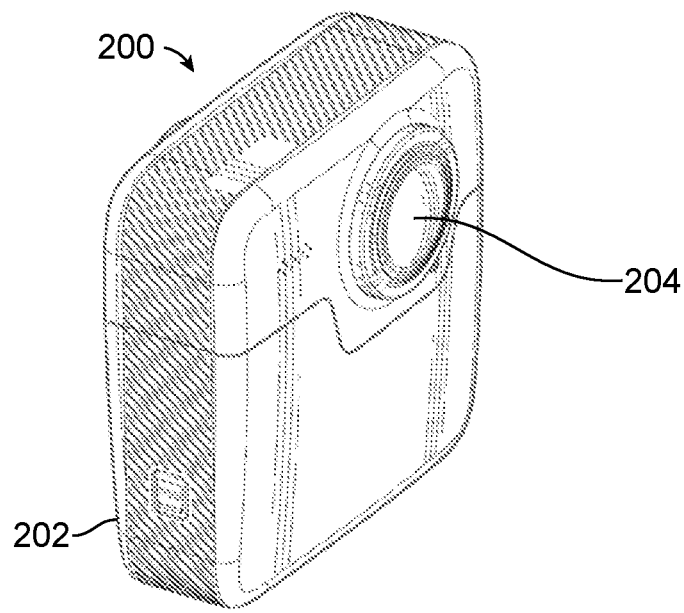
FIGS. 2A-B are isometric views of another example of an image capture device.
Figure 2B:
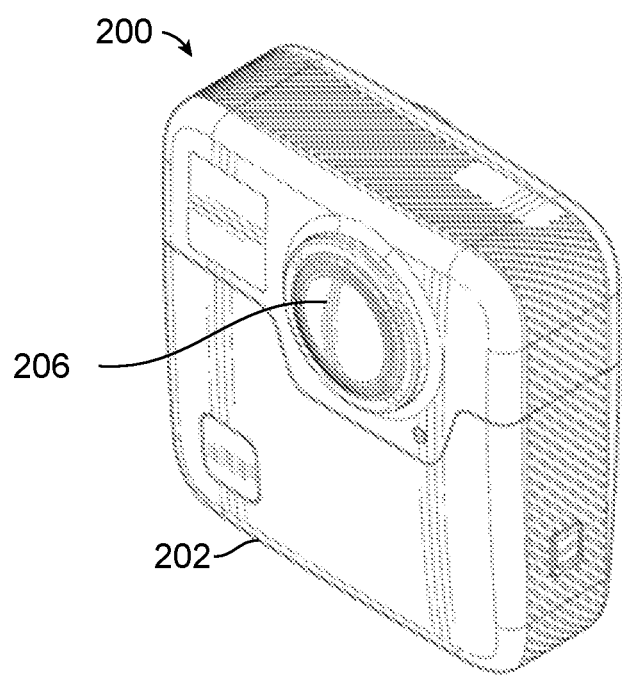

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
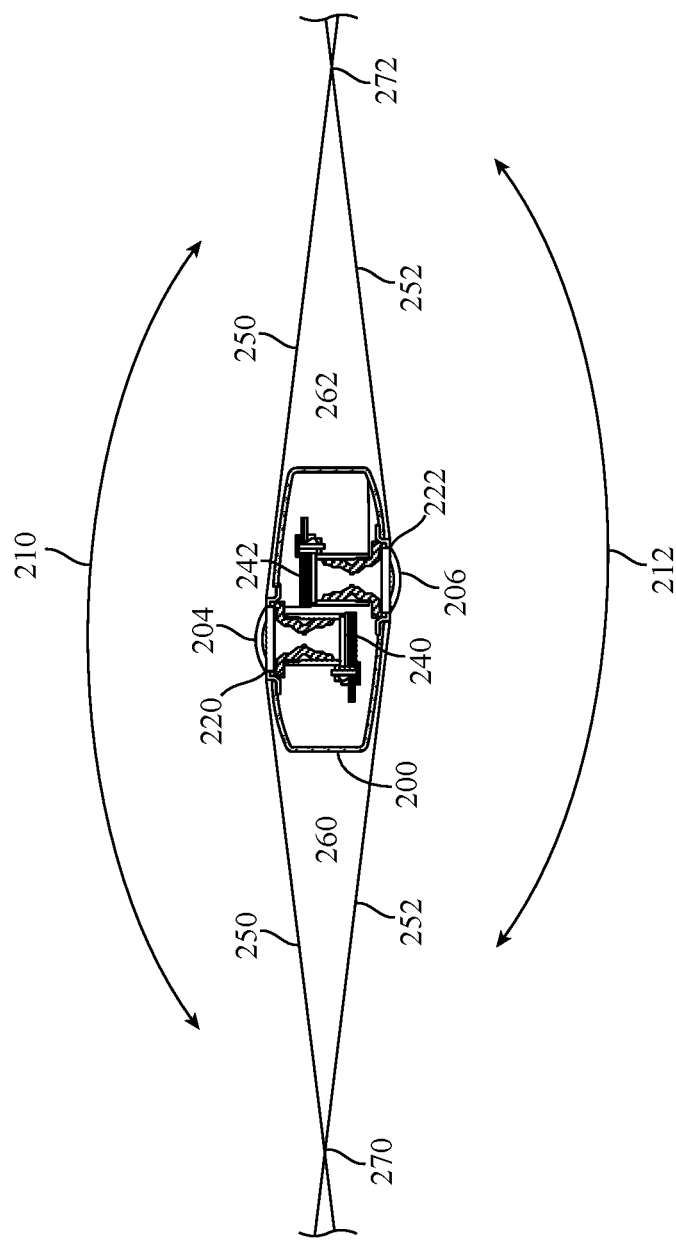
FIG. 2C is a cross-sectional view of the image capture device of FIGS. 2A-B.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensor 314, image sensor 316, or both. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP).

In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 8:
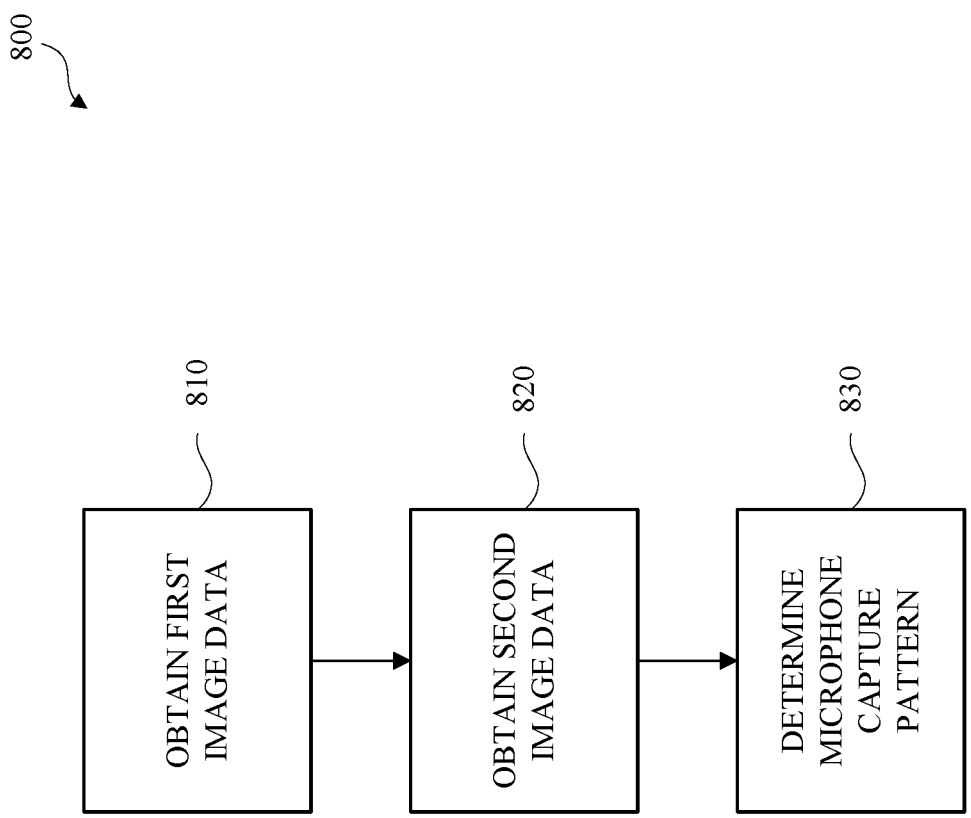
FIG. 8 is a flow diagram of a method for determining a microphone pattern configuration in accordance with embodiments of this disclosure.

The image capture system 300 may implement some or all of the techniques described in this disclosure, such as the method 800 described in FIG. 8.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the techniques described in this disclosure, such as the method 800 of FIG. 8.

Figure 4A:
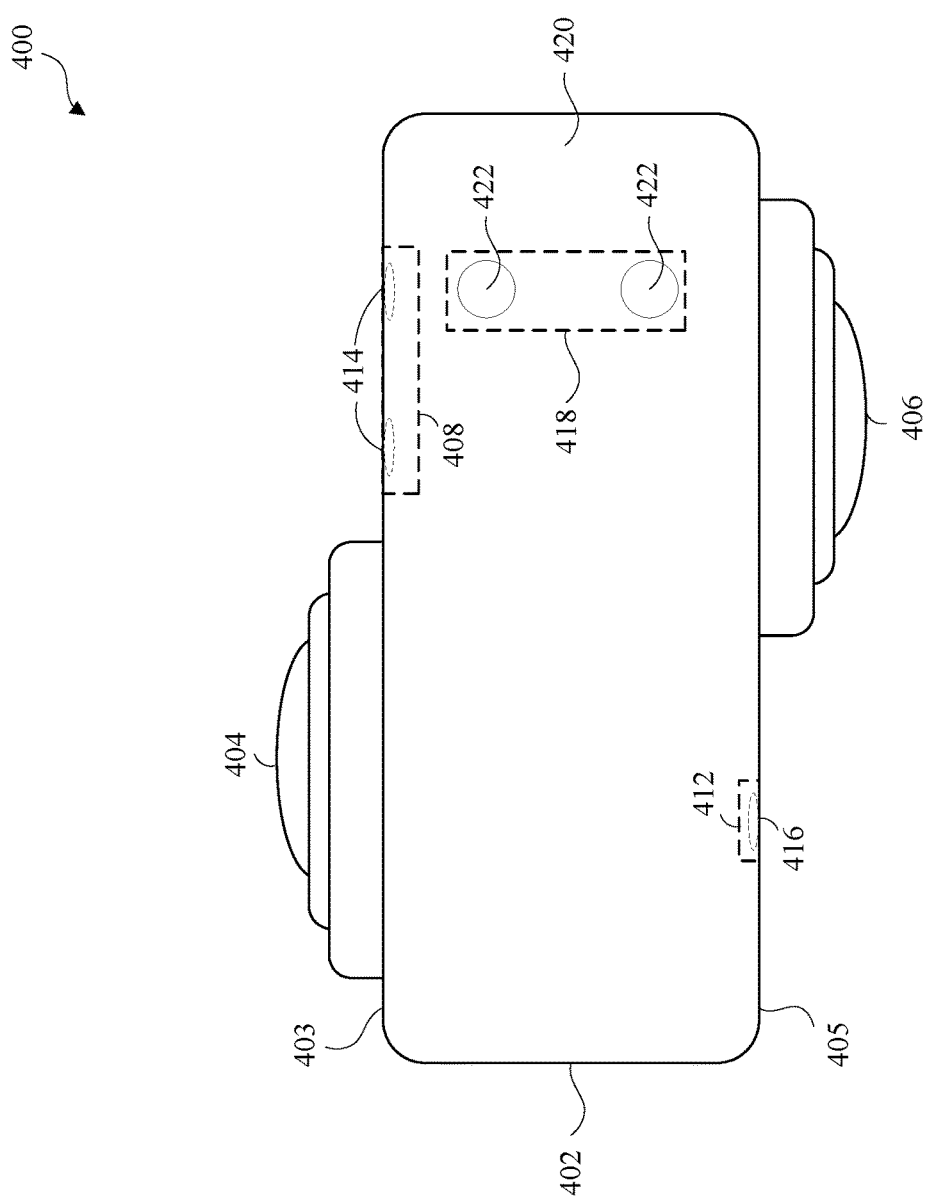
FIG. 4A is a diagram of a top-view of an image capture device in accordance with embodiments of this disclosure.

FIG. 4A is a diagram of a top-view of an image capture device 400 in accordance with embodiments of this disclosure. The image capture device 400 comprises a camera body 402 having two camera lenses 404, 406 structured on front and back surfaces 403, 405 of the camera body 402. The two lenses 404, 406 are oriented in opposite directions and couple with two images sensors mounted on circuit boards (not shown). Other electrical camera components (e.g., an image processor, camera SoC (system-on-chip), etc.) may also be included on one or more circuit boards within the camera body 402 of the image capture device 400.

The lenses 404, 406 may be laterally offset from each other, may be off-center from a central axis of the image capture device 400, or may be laterally offset and off-center from the central axis. As compared to an image capture device with back-to-back lenses, such as lenses aligned along the same axis, the image capture device 400 including laterally offset lenses 404, 406 may include substantially reduced thickness relative to the lengths of the lens barrels securing the lenses 404, 406. For example, the overall thickness of the image capture device 400 may be close to the length of a single lens barrel as opposed to twice the length of a single lens barrel as in a back-to-back configuration.

The image capture device 400 includes a microphone array that comprises a front-facing component 408, a rear-facing component 412, and a side-facing component 418. The side-facing component 418 may be on any side of the image capture device 400 that is perpendicular to the front-facing component 408 and the rear-facing component 412, and may include a top surface, a bottom surface, a left surface, a right surface, or any combination thereof. As shown in FIG. 4A, the front-facing component 408 is disposed on the front surface 403 of the image capture device. The front-facing component 408 may include one or more microphone elements 414. The microphone elements 414 may be configured such that they are distanced approximately 6 mm to 18 mm apart. The rear-facing component 412 is disposed on the back surface 405 of the image capture device 400. The rear-facing component 412 may include one or more microphone elements 416. One or more of the microphone elements 416 may be configured as a drain microphone. The side-facing component 418 is shown on a top surface 420 of the image capture device 400 in this example. The side-facing component 418 may include one or more microphone elements 422. The microphone elements 422 may be configured such that they are distanced approximately 6 mm to 18 mm apart. The 6 mm to 18 mm spacing may determine the frequency resolution of the output. For example, the larger the spacing, the lower the highest resolvable frequency. The spacing may be adjusted depending on the resolution required.

Figure 5:
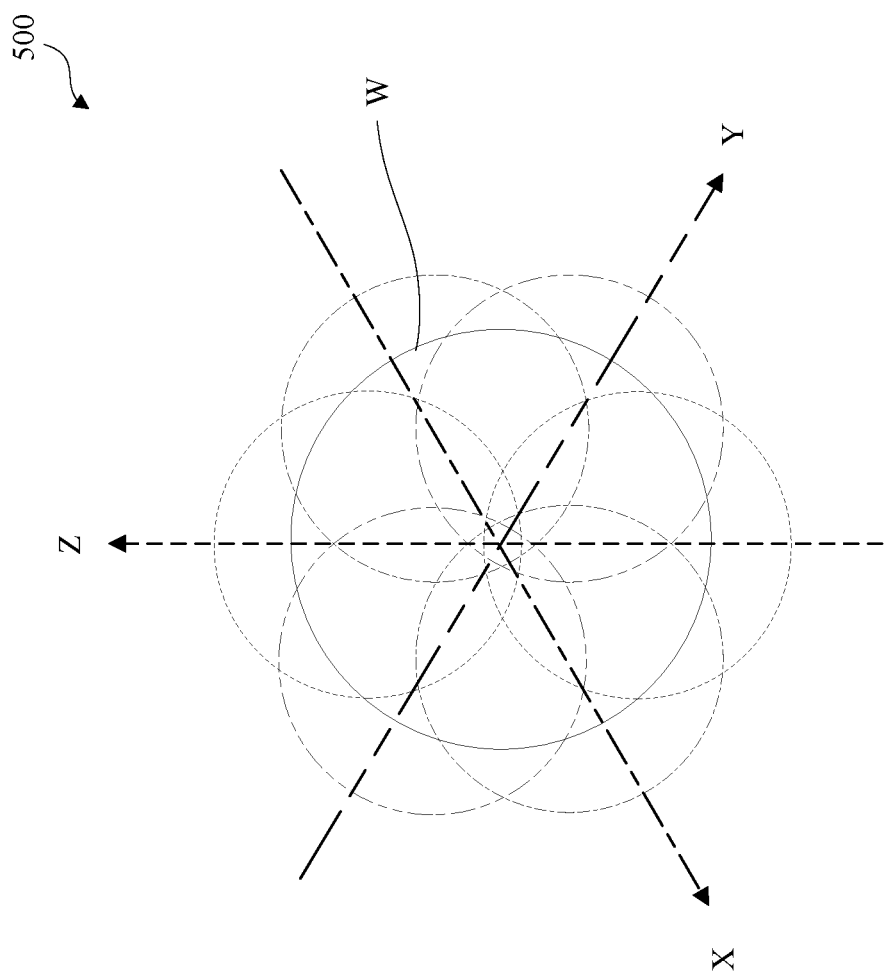
FIG. 5 is a diagram of a First Order Ambisonics B format sensitivity plot.

The front-facing component 408, microphone elements 414, rear-facing component 412, and microphone elements 416 are shown in broken lines as they may not be visible in this view. The front-facing component 408, rear-facing component 412, and side-facing component 418 of the microphone array may represent microphone elements on an X, Y, Z axis to create X, Y, Z components of a First Order Ambisonics B-Format, as shown in FIG. 5. These microphone elements may be oriented on a sphere or off-axis, and may be transformed to the First Order Ambisonics B-Format.

Figure 4B:
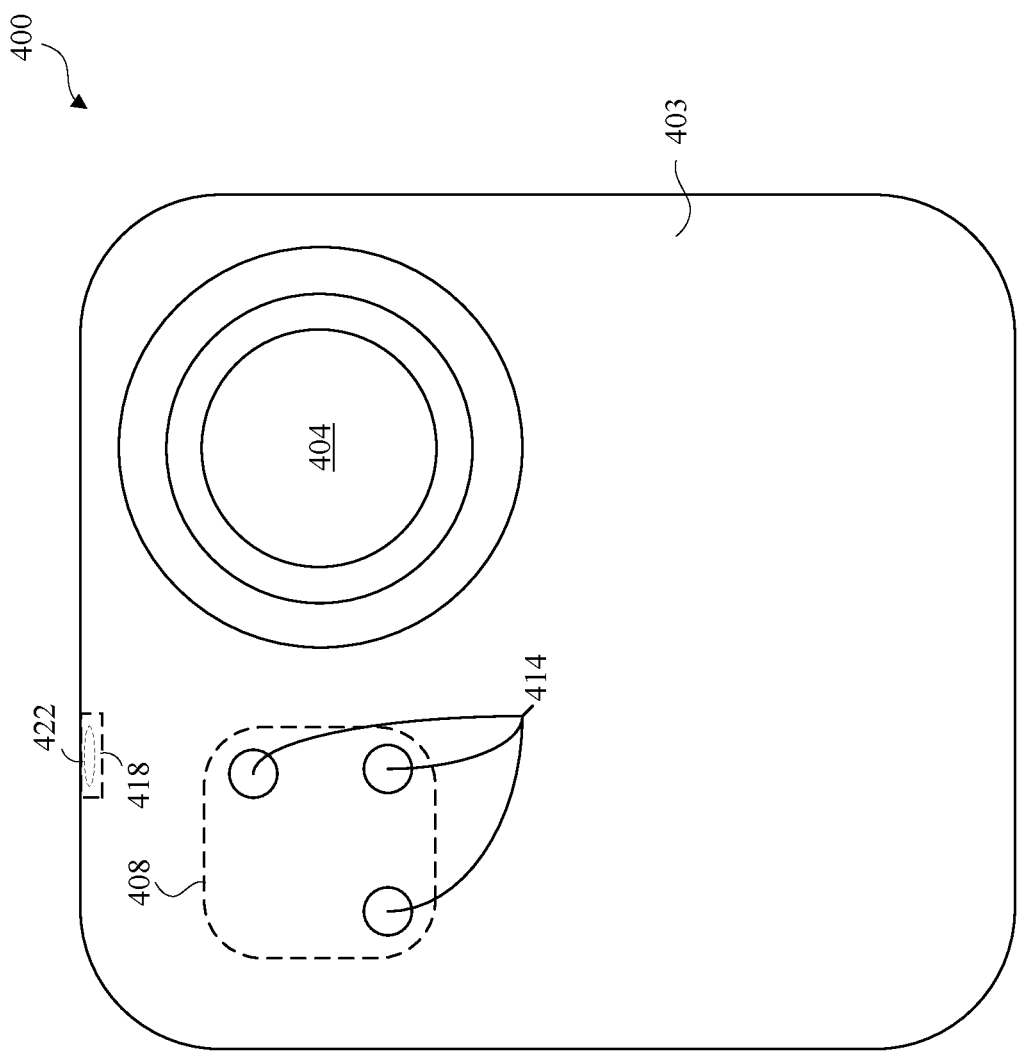
FIG. 4B is a diagram of a front-view of the image capture device shown in FIG. 4A in accordance with embodiments of this disclosure.

FIG. 4B is a diagram of a front-view of the image capture device 400 shown in FIG. 4A in accordance with embodiments of this disclosure. As shown in FIG. 4B, the front surface 403 of the image capture device 400 comprises the camera lens 404 and the front-facing component 408. Although the front-facing component 408 may include any number of microphone elements, the example shown in FIG. 4B includes three microphone elements 414. Each of the microphone elements 414 may be configured such that they are distanced approximately 6 mm to 18 mm apart. The side-facing component 418 and the microphone elements 422 are shown in broken lines as they may not be visible in this view.

Figure 4C:
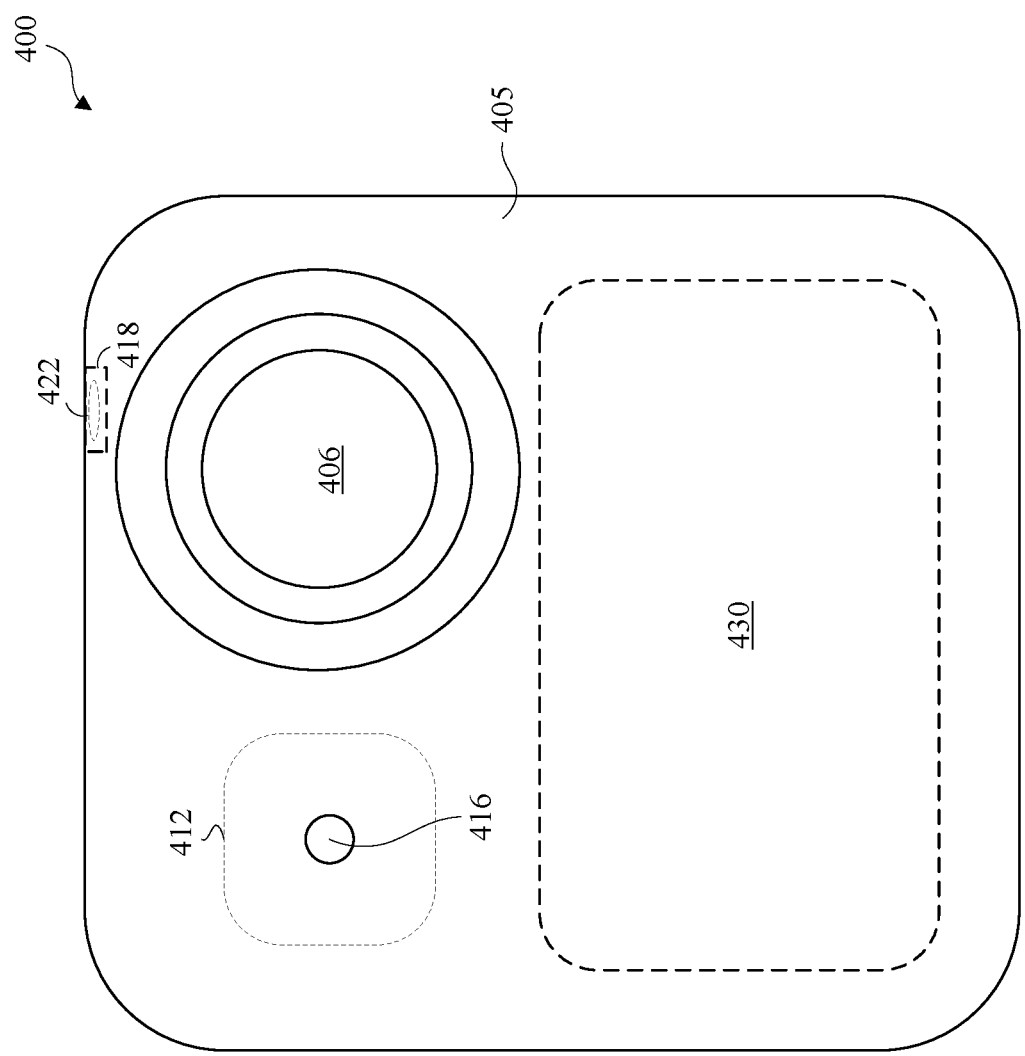
FIG. 4C is a diagram of a rear-view of the image capture device shown in FIG. 4A in accordance with embodiments of this disclosure.

FIG. 4C is a diagram of a rear-view of the image capture device 400 shown in FIG. 4A in accordance with embodiments of this disclosure. As shown in FIG. 4C, the back surface 405 of the image capture device 400 comprises the camera lens 406 and the rear-facing component 412. In an example, the back surface 405 of the image capture device 400 may include an interactive display 430 that allows for interaction with the image capture device 400 while simultaneously displaying information on a surface of the image capture device 400. Although the rear-facing component 412 may include any number of microphone elements, the example shown in FIG. 4C includes one microphone element 416. In an example, one or more of the microphone elements 416 may be configured as a drain microphone. The side-facing component 418 and the microphone elements 422 are shown in broken lines as they may not be visible in this view.

FIG. 5 is a diagram of a First Order Ambisonics B format sensitivity plot 500. The sensitivity plot 500 is an example of a pickup pattern of virtual microphones that are created through the processing of the signals from all or some of the omnidirectional microphone elements. In an example, the sensitivity plot 500 may be created from directional microphones. The front-facing component 408, rear-facing component 410, and side-facing component 412 of the microphone array of FIG. 4A may be used to capture omnidirectional signals and transform the omnidirectional signals into a first order Ambisonics B-format. The first order Ambisonics B-format may include four signals corresponding to three figure-8 signals X, Y, Z and one mono signal W, as shown in FIG. 5. Each signal X, Y, and Z may represent a respective axis in a three-dimensional sound field such as sound field 500.

The signals may be arranged into channels. For example, a W-channel may represent the mono sound pressure, an X-channel may represent a front-minus-back sound pressure gradient, a Y-channel may represent a left-minus-right sound pressure gradient, and a Z-channel may represent an up-minus-down sound pressure gradient. This four-channel format may represent the sensitivity plot 500.

Microphone elements such as microphone elements 414, microphone elements 416, and microphone elements 422 may be oriented in such a way that a pair of microphone elements reside on each X, Y, and Z axis. In an example, each pair of microphone elements may be used to create a figure-8 signal on each axis as shown in FIG. 5. The mono channel W may be created from a single microphone element or a sum of two or more microphone elements. In an example, a drain microphone may not be used for Ambisonics.

Figure 6:
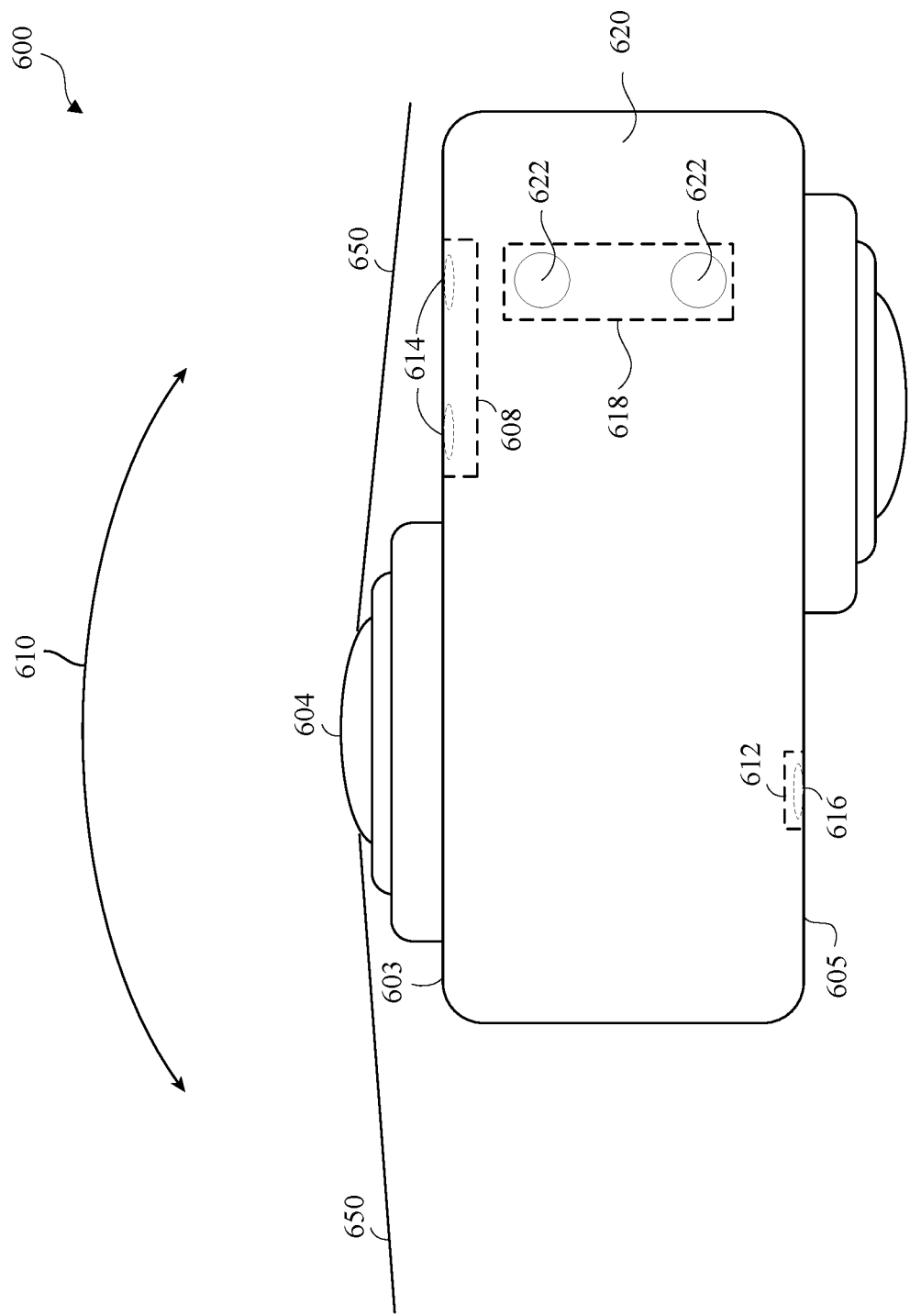
FIG. 6. is a diagram of a top-view of an image capture device configured to determine a microphone capture pattern in accordance with embodiments of this disclosure.

FIG. 6 is a diagram of a top-view of an image capture device 600 configured to determine a microphone capture pattern in accordance with embodiments of this disclosure. The microphone capture pattern may be based on sensor data. The sensor data may include, for example data obtained from an image sensor, a microphone, an IMU, a GPS receiver component, a pressure sensor, a temperature sensor, a heart rate sensor, or any other sensor, or combination of sensors.

The image capture device 600 includes a front surface 603 that comprises a front-facing camera lens 604 and a front-facing component 608. Although the front-facing component 608 may include any number of microphone elements, the example shown in FIG. 6 includes two microphone elements 614. Each of the microphone elements 614 may be configured such that they are distanced approximately 6 mm to 18 mm apart. The front-facing component 608 and microphone elements 614 are shown in broken lines as they may not be visible in this view. The front-facing camera lens 604 of the image capture device 600 may have the field-of-view 610 shown above a boundary 650.

The image capture device 600 includes a microphone array that comprises the front-facing component 608, a rear-facing component 612, and a side-facing component 618. The side-facing component 618 may be on any side of the image capture device 600 that is perpendicular to the front-facing component 608 and the rear-facing component 612, and may include a top surface, a bottom surface, a left surface, a right surface, or any combination thereof. As shown in FIG. 6, the front-facing component 608 is disposed on the front surface 603 of the image capture device. The front-facing component 608 may include one or more microphone elements 614. The microphone elements 614 may be configured such that they are distanced approximately 6 mm to 18 mm apart. The rear-facing component 612 is disposed on the back surface 605 of the image capture device 600. The rear-facing component 612 may include one or more microphone elements 616. One or more of the microphone elements 616 may be configured as a drain microphone. The side-facing component 618 is shown on a top surface 620 of the image capture device 600 in this example. The side-facing component 618 may include one or more microphone elements 622. The microphone elements 622 may be configured such that they are distanced approximately 6 mm to 18 mm apart. The front-facing component 608, microphone elements 614, rear-facing component 612, and microphone elements 616 are shown in broken lines as they may not be visible in this view.

In this example, the image capture device 600 may perform an image capture using the front-facing camera lens 604 to capture the field-of-view 610 with various microphone patterns based on the user activity, user preference, image capture device orientation, or any combination thereof. In an example, the image capture device 600 may be configured to perform an image capture using the front-facing camera lens 604 and capture audio using the front-facing component 608. A processor, such as processing apparatus 312 of FIG. 3A, may be configured to determine a microphone capture pattern that captures mono or stereo audio using one or more of the microphone elements 614 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors. For example, the processor may determine that the captured audio includes voice audio. In an example, if voice audio is detected, the processor may select a microphone capture pattern that captures audio from the rear-facing microphone or any microphone facing the direction from which the voice is originating. The microphone capture pattern may be a cardioid pattern that is configured to focus on the voice of the user. In an example, the microphones may not be facing the user in order to create a capture pattern that focuses on the user.

In another example, the image capture device 600 may be configured to perform an image capture using the front-facing camera lens 604 and capture audio using the rear-facing component 612. A processor, such as processing apparatus 312 of FIG. 3A, may be configured to determine a microphone capture pattern that captures audio using one or more of the microphone elements 616 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 600 may be configured to perform an image capture using the front-facing camera lens 604 and capture audio using the side-facing component 618. A processor, such as processing apparatus 312 of FIG. 3A, may be configured to determine a microphone capture pattern that captures audio using one or more of the microphone elements 622 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 600 may be configured to perform an image capture using the front-facing camera lens 604 and capture audio using the front-facing component 608 and the side-facing component 618. A processor, such as processing apparatus 312 of FIG. 3A, may be configured to determine a microphone capture pattern that captures audio using one or more of the microphone elements 614 and one or more of the microphone elements 622 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 600 may be configured to perform an image capture using the front-facing camera lens 604 and capture audio using the rear-facing component 612 and the side-facing component 618. A processor, such as processing apparatus 312 of FIG. 3A, may be configured to determine a microphone capture pattern that captures audio using one or more of the microphone elements 616 and one or more of the microphone elements 622 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 600 may be configured to perform an image capture using the front-facing camera lens 604 and capture audio using the front-facing component 608 and the rear-facing component 612. A processor, such as processing apparatus 312 of FIG. 3A, may be configured to determine a microphone capture pattern that captures audio using one or more of the microphone elements 614 and one or more of the microphone elements 616 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 600 may be configured to perform an image capture using the front-facing camera lens 604 and capture audio using the front-facing component 608, the rear-facing component 612, and the side-facing component 618. A processor, such as processing apparatus 312 of FIG. 3A, may be configured to determine a microphone capture pattern that captures audio using one or more of the microphone elements 614, one or more of the microphone elements 616, and one or more of the microphone elements 622 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

Figure 7:
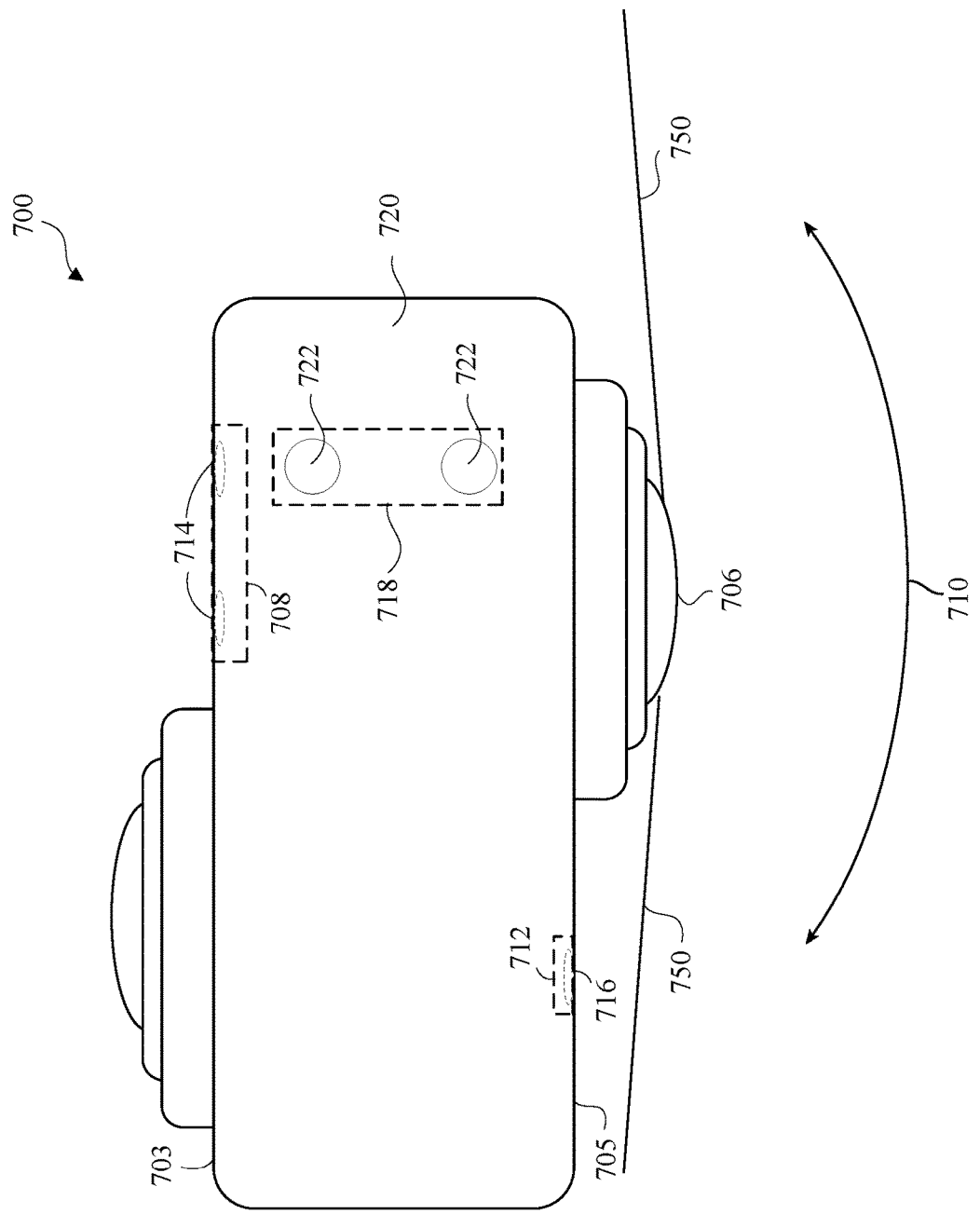
FIG. 7 is a diagram of a top-view of an image capture device configured to determine a microphone capture pattern in accordance with embodiments of this disclosure.

FIG. 7 is a diagram of a top-view of an image capture device 700 configured to determine a microphone capture pattern in accordance with embodiments of this disclosure. The microphone capture pattern may be based on sensor data. The sensor data may include, for example data obtained from an image sensor, a microphone, an IMU, a GPS receiver component, a pressure sensor, a temperature sensor, a heart rate sensor, or any other sensor, or combination of sensors.

The image capture device 700 includes a rear surface 705 that comprises a rear-facing camera lens 706 and a rear-facing component 712. Although the rear-facing component 708 may include any number of microphone elements, the example shown in FIG. 7 includes one microphone element 716. Each of the microphone elements 716 may be configured such that they are distanced approximately 6 mm to 18 mm apart. The rear-facing component 712 and microphone elements 716 are shown in broken lines as they may not be visible in this view. The rear-facing camera lens 706 of the image capture device 700 may have the field-of-view 710 shown above a boundary 750.

The image capture device 700 includes a microphone array that comprises a front-facing component 708, the rear-facing component 712, and a side-facing component 718. The side-facing component 718 may be on any side of the image capture device 700 that is perpendicular to the front-facing component 708 and the rear-facing component 712, and may include a top surface, a bottom surface, a left surface, a right surface, or any combination thereof. As shown in FIG. 7, the front-facing component 708 is disposed on the front surface 703 of the image capture device. The front-facing component 708 may include one or more microphone elements 714. The microphone elements 714 may be configured such that they are distanced approximately 6 mm to 18 mm apart. The rear-facing component 712 is disposed on the back surface 705 of the image capture device 700. The rear-facing component 712 may include one or more microphone elements 716. One or more of the microphone elements 716 may be configured as a drain microphone. The side-facing component 718 is shown on a top surface 720 of the image capture device 700 in this example. The side-facing component 718 may include one or more microphone elements 722. The microphone elements 722 may be configured such that they are distanced approximately 6 mm to 18 mm apart. The front-facing component 708, microphone elements 714, rear-facing component 712, and microphone elements 716 are shown in broken lines as they may not be visible in this view.

In this example, the image capture device 700 may perform an image capture using the rear-facing camera lens 706 to capture the field-of-view 710 with various microphone patterns based on the user activity, user preference, image capture device orientation, or any combination thereof. In an example, the image capture device 700 may be configured to perform an image capture using the rear-facing camera lens 706 and capture audio using the front-facing component 708. A processor, such as processing apparatus 312 of FIG. 3A, may be configured to determine a microphone capture pattern that captures mono or stereo audio using one or more of the microphone elements 714 during image capture via the rear-facing camera lens 706. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors. For example, the processor may determine whether the captured audio includes voice audio. In an example, if voice audio is not detected, the processor may select a microphone capture pattern that captures audio from the front-facing microphone.

In another example, the image capture device 700 may be configured to perform an image capture using the rear-facing camera lens 706 and capture audio using the rear-facing component 712. A processor, such as processing apparatus 312 of FIG. 3A, may be configured to determine a microphone capture pattern that captures audio using one or more of the microphone elements 716 during image capture via the rear-facing camera lens 706. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 700 may be configured to perform an image capture using the rear-facing camera lens 706 and capture audio using the side-facing component 718. A processor, such as processing apparatus 312 of FIG. 3A, may be configured to determine a microphone capture pattern that captures audio using one or more of the microphone elements 722 during image capture via the rear-facing camera lens 706. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 700 may be configured to perform an image capture using the rear-facing camera lens 706 and capture audio using the front-facing component 708 and the side-facing component 718. A processor, such as processing apparatus 312 of FIG. 3A, may be configured to determine a microphone capture pattern that captures audio using one or more of the microphone elements 714 and one or more of the microphone elements 722 during image capture via the rear-facing camera lens 706. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 700 may be configured to perform an image capture using the rear-facing camera lens 706 and capture audio using the rear-facing component 712 and the side-facing component 718. A processor, such as processing apparatus 312 of FIG. 3A, may be configured to determine a microphone capture pattern that captures audio using one or more of the microphone elements 716 and one or more of the microphone elements 722 during image capture via the rear-facing camera lens 706. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 700 may be configured to perform an image capture using the rear-facing camera lens 706 and capture audio using the front-facing component 708 and the rear-facing component 712. A processor, such as processing apparatus 312 of FIG. 3A, may be configured to determine a microphone capture pattern that captures audio using one or more of the microphone elements 714 and one or more of the microphone elements 716 during image capture via the rear-facing camera lens 706. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In another example, the image capture device 700 may be configured to perform an image capture using the rear-facing camera lens 706 and capture audio using the front-facing component 708, the rear-facing component 712, and the side-facing component 718. A processor, such as processing apparatus 312 of FIG. 3A, may be configured to determine a microphone capture pattern that captures audio using one or more of the microphone elements 714, one or more of the microphone elements 716, and one or more of the microphone elements 722 during image capture via the rear-facing camera lens 706. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

Although the image capture examples of FIG. 6 and FIG. 7 are described separately, the actions described herein may be performed simultaneously in the same device in conjunction with the various microphone capture patterns. For example, an image capture may be performed simultaneously using both camera lenses, and audio may be captured using all available microphone elements. In this example, the microphone capture patterns may be selected in post-image capture editing.

FIG. 8 is a flow diagram of a method 800 for determining a microphone pattern configuration. The method 800 includes obtaining first image data 810, obtaining second image data 820, and determining a microphone capture pattern 830. The first image data may be obtained from a first image sensor facing a first direction. The second image data may be obtained from a second image sensor facing a second direction. In an example, the second direction may be diametrically opposed to the first direction. Determining a microphone capture pattern 830 may be based on the first image data, the second image data, a user input, or a combination thereof. The method 800 may include detecting voice audio. In an example, if voice audio is detected, the method 800 may include selecting a microphone capture pattern that captures audio from the rear-facing microphone or any microphone facing the direction from which the voice is originating. In an example, the microphones may not be facing the user in order to create a capture pattern that focuses on the user.

The determined microphone capture pattern may be associated with a sound field of a first microphone facing the first direction, a sound field of a second microphone facing the second direction, or a sound field of a third microphone facing a third direction. In an example, the third direction may be substantially perpendicular to the first and second directions.

The image capture may be performed using a front-facing camera lens while simultaneously capturing the sound field of the first microphone, the sound field of the second microphone, the sound field of the third microphone, or any combination thereof. The image capture may be performed using a rear-facing camera lens while simultaneously capturing the sound field of the first microphone, the sound field of the second microphone, the sound field of the third microphone, or any combination thereof.

The determined microphone capture pattern may be associated with a sound field of the first microphone and the second microphone. The determined microphone capture pattern may be associated with a sound field of the first microphone and the third microphone. The determined microphone capture pattern may be associated with a sound field of the second microphone and the third microphone. The determined microphone capture pattern may be associated with a sound field of the first microphone, the second microphone, and the third microphone.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   a first hyper-hemispherical image sensor on a first surface facing a first direction, the first image sensor having a first field-of-view (FOV) and configured to obtain first image data;
   a second hyper-hemispherical image sensor facing a second direction, the second direction being diametrically opposed to the first direction, the second image sensor having a second FOV that partially overlaps with the first FOV and configured to obtain second image data;
   a microphone array comprising:
      a first microphone component facing the first direction, wherein the first microphone component comprises three microphone elements in a triangular arrangement, wherein the three microphone elements are on a same side of the first surface relative to the first hyper-hemispherical image sensor;
      a second microphone component facing the second direction, wherein the second microphone component comprises at least one microphone element; and
      a third microphone component facing a third direction that is perpendicular to the first and second directions, wherein the third microphone component comprises at least two microphone elements arranged parallel to an optical axis of the first hyper-hemispherical image sensor or the second hyper-hemispherical image sensor; and
   a processor configured to determine a microphone capture pattern based on a detected direction of voice audio.

2. The image capture device of claim 1, wherein the microphone capture pattern is associated with a sound field of the first microphone component, a sound field of the second microphone component, or a sound field of the third microphone component.

3. The image capture device of claim 1, wherein the microphone capture pattern is associated with a sound field of the first microphone component and the second microphone component.

4. The image capture device of claim 1, wherein the microphone capture pattern is associated with a sound field of the first microphone component and the third microphone component.

5. The image capture device of claim 1, wherein the microphone capture pattern is associated with a sound field of the second microphone component and the third microphone component.

6. The image capture device of claim 1, wherein the microphone capture pattern is associated with a sound field of the first microphone component, the second microphone component, and the third microphone component.

7. A method comprising:
   obtaining first image data from a first hyper-hemispherical image sensor on a first surface facing a first direction;
   obtaining second image data from a second hyper-hemispherical image sensor facing a second direction, the second direction being diametrically opposed to the first direction;
   obtaining a first microphone signal from a first microphone component facing the first direction that includes three microphone elements in a triangular arrangement, wherein the three microphone elements are on a same side of the first surface relative to the first image sensor;
   obtaining a second microphone signal from a second microphone component that includes at least one microphone element;
   obtaining a third microphone signal from a third microphone component that includes at least two microphone elements arranged parallel to an optical axis of the first hyper-hemispherical image sensor or the second hyper-hemispherical image sensor; and
   determining a microphone capture pattern based on a detected direction of voice audio.

8. The method of claim 7, wherein the determined microphone capture pattern is associated with a sound field of the first microphone component facing the first direction, a sound field of the second microphone component facing the second direction, or a sound field of the third microphone component facing a third direction that is perpendicular to the first and second directions.

9. The method of claim 7, wherein the determined microphone capture pattern is associated with a sound field of the first microphone component and the second microphone component.

10. The method of claim 7, wherein the determined microphone capture pattern is associated with a sound field of the first microphone component and the third microphone component.

11. The method of claim 7, wherein the determined microphone capture pattern is associated with a sound field of the second microphone component and the third microphone component.

12. The method of claim 7, wherein the determined microphone capture pattern is associated with a sound field of the first microphone component, the second microphone component, and the third microphone component.

13. An image capture device comprising:
   a sensor;
   a microphone array comprising:
      a first microphone component facing a first direction, wherein the first microphone component comprises three microphone elements in a triangular arrangement spaced at least 6 mm and less than 18 mm apart;
      a second microphone component facing a second direction, the second direction being diametrically opposed to the first direction, wherein the second microphone component comprises at least one microphone element; and
      a third microphone component facing a third direction that is perpendicular to the first and second directions, wherein the third microphone component comprises at least two microphone elements; and
   a processor configured to determine a microphone capture pattern based on a detected direction of voice audio.

14. The image capture device of claim 13, wherein the sensor is an image sensor.

15. The image capture device of claim 13, wherein the sensor is an inertial measurement unit (IMU).

16. The image capture device of claim 13, wherein the sensor is a global positioning system (GPS) receiver component.

17. The image capture device of claim 13, wherein the first microphone component is configured to transform a sound capture to an X-axis component of an Ambisonics B-Format.

18. The image capture device of claim 13, wherein the second microphone component is configured to transform a sound capture to a Y-axis component of an Ambisonics B-Format.

19. The image capture device of claim 13, wherein the third microphone component is configured to transform a sound capture to a Z-axis component of an Ambisonics B-Format.

20. The image capture device of claim 13, wherein the second microphone component is configured as a drain microphone.

* * * * *